(12) United States Patent
Guikema et al.

(10) Patent No.: US 12,355,239 B2
(45) Date of Patent: Jul. 8, 2025

(54) SPATIAL POWER OUTAGE ESTIMATION FOR NATURAL HAZARDS LEVERAGING OPTIMAL SYNTHETIC POWER NETWORKS

(71) Applicant: THE REGENTS OF THE UNIVERSITY OF MICHIGAN, Ann Arbor, MI (US)

(72) Inventors: Seth David Guikema, Ann Arbor, MI (US); Chengwei Zhai, Sunnyvale, CA (US); Anna White, Ann Arbor, MI (US); Thomas Ying-Jeh Chen, Silver Spring, MD (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 239 days.

(21) Appl. No.: 17/381,863

(22) Filed: Jul. 21, 2021

(65) Prior Publication Data
US 2022/0029418 A1    Jan. 27, 2022

Related U.S. Application Data

(60) Provisional application No. 63/056,478, filed on Jul. 24, 2020.

(51) Int. Cl.
*H02J 3/00*      (2006.01)
*G06N 20/00*   (2019.01)
*G06Q 50/06*  (2024.01)

(52) U.S. Cl.
CPC .............. *H02J 3/001* (2020.01); *G06N 20/00* (2019.01); *G06Q 50/06* (2013.01); *H02J 2203/20* (2020.01)

(58) Field of Classification Search
CPC ...... H02J 3/001; H02J 2203/20; G06Q 50/06; G06Q 10/04; G06Q 10/0635; G06N 5/01;
(Continued)

(56) References Cited

U.S. PATENT DOCUMENTS

| | | | |
|---|---|---|---|
| 7,046,841 B1 * | 5/2006 | Dow | G06V 20/64 |
| | | | 382/154 |
| 7,739,138 B2 * | 6/2010 | Chauhan | G06Q 10/063112 |
| | | | 705/7.14 |

(Continued)

FOREIGN PATENT DOCUMENTS

| | | | | |
|---|---|---|---|---|
| JP | 5088628 B2 * | 12/2012 | | Y04S 10/54 |
| WO | WO-2018/013148 A1 | 1/2018 | | |

OTHER PUBLICATIONS

JP-5088628-B2 (Dec. 2012) machine translation.*
(Continued)

*Primary Examiner* — M. N. Von Buhr
(74) *Attorney, Agent, or Firm* — MARSHALL, GERSTEIN & BORUN LLP; Randall G. Rueth

(57) ABSTRACT

The following relates generally to calculating estimated power outages during a natural disaster event. In this regard, some embodiments create a synthetic network of a power infrastructure of a geographic area by: determining a location of a power substation; determining a location of a customer; determining a location of a power line linking the power substation to the customer; and determining if the power line is overhead or underground. Some embodiments then use the created synthetic network to simulate an event to calculate the estimated power outages during the event.

19 Claims, 8 Drawing Sheets

(58) Field of Classification Search
CPC ........ G06N 20/00; G06N 20/20; Y02E 40/70; Y04S 10/50

See application file for complete search history.

(56) References Cited

U.S. PATENT DOCUMENTS

| | | | | |
|---|---|---|---|---|
| 8,589,201 | B2* | 11/2013 | Nielsen | G06Q 10/06 705/7.11 |
| 9,297,723 | B1* | 3/2016 | Hofmann | G06N 20/00 |
| 9,360,588 | B2* | 6/2016 | Young | G01V 11/00 |
| 10,444,806 | B2* | 10/2019 | Brockman | G06Q 10/101 |
| 11,144,835 | B2* | 10/2021 | Anagnostou | G06Q 10/04 |
| 11,263,538 | B1* | 3/2022 | Minarovic | G06N 3/08 |
| 11,709,870 | B2* | 7/2023 | Worster | G06F 17/18 701/532 |
| 11,954,907 | B2* | 4/2024 | Gupta | G06T 5/30 |
| 2012/0022713 | A1* | 1/2012 | Deaver, Sr. | G05B 17/02 700/298 |
| 2012/0127161 | A1* | 5/2012 | Wallbom | G06T 19/006 345/419 |
| 2013/0096976 | A1* | 4/2013 | Alpert | G06Q 10/06 705/7.23 |
| 2014/0257913 | A1* | 9/2014 | Ball | G01C 21/343 705/7.25 |
| 2015/0123664 | A1* | 5/2015 | Olsson | G01V 3/081 324/326 |
| 2018/0247001 | A1* | 8/2018 | Liu | G06F 16/955 |
| 2019/0019398 | A1* | 1/2019 | Hender | G08B 23/00 |
| 2019/0138995 | A1* | 5/2019 | Currin | G06F 16/9537 |
| 2020/0097618 | A1* | 3/2020 | Agouridis | G06T 19/006 |
| 2020/0379824 | A1* | 12/2020 | Chongfuangprinya | G06F 17/18 |
| 2021/0248693 | A1* | 8/2021 | Riland | G06Q 10/06 |
| 2021/0373063 | A1* | 12/2021 | Gundel | H02H 7/22 |
| 2022/0138467 | A1* | 5/2022 | Eastman | G06Q 50/06 345/633 |
| 2022/0375219 | A1* | 11/2022 | Gupta | G06F 30/18 |
| 2023/0186621 | A1* | 6/2023 | Gupta | G06T 7/50 345/420 |

OTHER PUBLICATIONS

Second Written Opinion for International Application No. PCT/US2021/042459, mailing date Jun. 14, 2022.

Birchfield et al., Grid Structural Characteristics as Validation Criteria for Synthetic Networks. IEEE Transactions on Power Systems, 32(4):3258-3265 (2017).

Birchfield et al., Statistical Considerations in the Creation of Realistic Synthetic Power Grids for Geomagnetic Disturbance Studies. IEEE Transactions on Power Systems, 32(2):1502-1510 (2017).

Campbell, Weather-Related Power Outages and Electric System Resiliency, Congressional Research Service Report for Congress, 18 pp. (2012).

Darestani et al., Multi-dimensional wind fragility functions for wood utility poles, Engineering Structures, 183:937-948 (2019).

Davidson et al., Electric Power Distribution System Performance in Carolina Hurricanes. Natural Hazards Review, 4(1):36-45 (2003).

Guikema et al., Hybrid data mining-regression for infrastructure risk assessment based on zero-inflated data, Reliability Engineering and System Safety, 99:178-182 (2012).

Guikema et al., Predicting hurricane power outages to support storm response planning, 2:1364-73 (Nov. 2014).

Guikema et al., Prestorm Estimation of Hurricane Damage to Electric Power Distribution Systems. Risk Analysis, 30(12):1744-1752 (2010).

Guikema et al., Statistical models of the effects of tree trimming on power system outages. IEEE Transactions on Power Delivery, 21(3), 1549-1557 (2006).

Han et al., Estimating the Spatial Distribution of Power Outages during Hurricanes in the Gulf Coast Region, Reliability Engineering & System Safety, vol. 94, No. 2, pp. 199-210 (2009).

International Application No. PCT/US2021/042459, International Search Report and Written Opinion, mailed Nov. 5, 2021.

Kezunovic et al., Predicting Spatiotemporal Impacts of Weather on Power Systems Using Big Data Science, Data Science and Big Data: An Environment of Computational Intelligence, pp. 265-299 (2017).

Kircher et al., HAZUS Earthquake Loss Estimation Methods, Natural Hazards Review, 7(2): 45-59 (2006).

Liu et al., Statistical forecasting of electric power restoration times in hurricanes and ice storms. IEEE Transactions on Power Systems, 22(4):2270-9 (2007).

Miranda et al., Genetic algorithms in optimal multistage distribution network planning, IEEE Transactions on Power Systems, 9(4):1927-33 (1994).

Nateghi et al., Power Outage Estimation for Tropical Cyclones: Improved Accuracy with Simpler Models, Risk Analysis, 34(6):1069-78 (2014).

Nine of the Worst Power Outages in United States History. Retrieved from Electric Choice, Downloaded from the Internet at: <<https://www.electricchoice.com/blog/worst-power-outages-in-united-states-history/>>, Eisenbach Consulting LLC (2017).

Pahwa et al., Abruptness of cascade failures in power grids, Scientific Reports, 4, Article No. 3694 (2014).

Salman et al., Age-dependent fragility and life-cycle cost analysis of wood and steel power distribution poles subjected to hurricanes. Structure and Infrastructure Engineering, 12(8): 890-903 (2016).

Schultz et al., A random growth model for power grids and other spatially embedded infrastructure networks, The European Physical Journal Special Topics, 223(12):2593-610 (2014).

Shafieezadeh et al., Age-dependent fragility models of utility wood poles in power distribution networks against extreme wind hazards, IEEE Transactions on Power Delivery, 29(1):131-9 (2014).

Shashaani et al., Multi-Stage Prediction for Zero-Inflated Hurricane Induced Power Outages, IEEE Access, 6:62432-49 (2018).

Soltan et al., Generation of synthetic spatially embedded power grid networks. IEEE Power and Energy Society General Meeting, published 2015.

Valenzuela et al., Planning of a Resilient Underground Distribution Network Using Georeferenced Data. Energies, 12(4): 644 (2019).

Vanzi, Seismic reliability of electric power networks: Methodology and application, Structural Safety, 18(4):311-327 (1996).

Vickery et al., HAZUS-MH Hurricane Model Methodology. II: Damage and Loss Estimation. Natural Hazards Review, 7(2), 94-103 (2006).

Yuan et al., Robust Optimization-Based Resilient Distribution Network Planning Against Natural Disasters, IEEE Transactions on Smart Grid, 7(6):2817-26 (2016).

Winkler et al., Performance assessment of topologically diverse power systems subjected to hurricane events, Reliability Engineering & System Safety, 95(4):323-36 (2010).

\* cited by examiner

SPATIAL POWER OUTAGE ESTIMATION FOR NATURAL HAZARDS LEVERAGING OPTIMAL SYNTHETIC POWER NETWORKS

CROSS-REFERENCE TO RELATED APPLICATION

This application claims the benefit of U.S. Provisional Application No. 63/056,478 (filed Jul. 24, 2020), the entirety of which is incorporated by reference herein.

BACKGROUND

Natural disasters, such as earthquakes, floods, and hurricanes, cause power outages. In this regard, it is useful to estimate what specific locations throughout a geographic area will lose power when a particular natural disaster occurs. The following teaches improved systems and methods for such power loss estimation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, there is a computer system for calculating estimated power outages. The computer system may include one or more processors configured to create a synthetic network of a power infrastructure of a geographic area by: determining a location of a power substation; determining a location of a customer; determining a location of a power line linking the power substation to the customer; and determining whether the power line is overhead or underground. The one or more processors may further be configured to simulate an event to calculate the estimated power outages during the event, wherein the calculation of the estimated power outages is based on the determination of if the power line is overhead or underground.

In another aspect, there is a computer-implemented method for calculating estimated power outages. The method may include: creating a synthetic network of a power infrastructure of a geographic area by: determining a location of a power substation; determining a location of a customer; determining a location of a power line linking the power substation to the customer; and determining that the power line is underground. The method may further include simulating an event to calculate the estimated power outages during the event, wherein the calculation of the estimated power outages is based on the determination that the power line is underground.

In yet another aspect, there is a computer system for calculating estimated power outages, the computer system comprising one or more processors configured to: create a synthetic network of a power infrastructure of a geographic area by creating a plurality of clusters, wherein each cluster of the plurality of clusters includes a substation and a plurality of buildings, and wherein each cluster is: (i) created based on a network distance from a building of the plurality of buildings of the cluster to the substation of the cluster, and (ii) not based on a Euclidian distance from the building of the plurality of buildings of the cluster to the substation of the cluster; and simulate an event to calculate the estimated power outages during the event, wherein the calculation of the estimated power outages is based on the created synthetic network.

DETAILED DESCRIPTION

Figure 1:
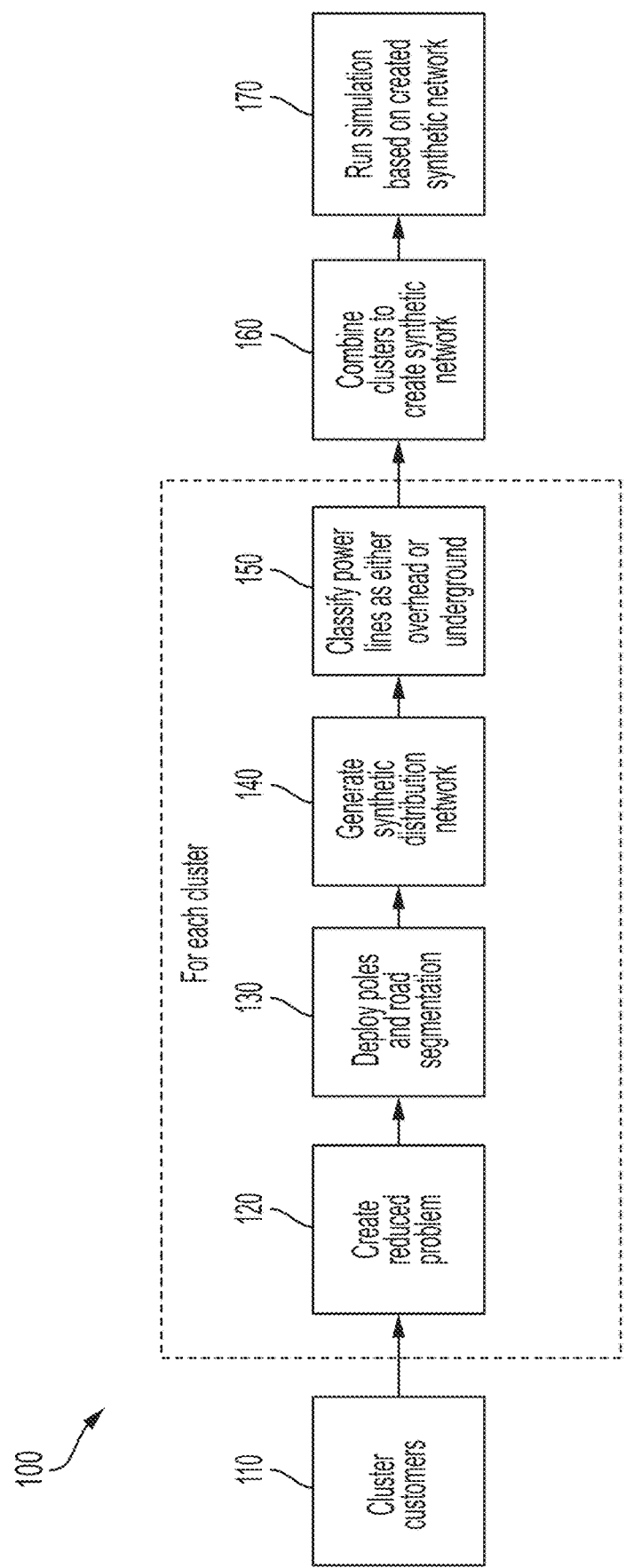
FIG. 1 illustrates an exemplary process of generating a synthetic power system.

The present embodiments relate to, inter alia, calculating estimated power outages during a natural disaster event.

Power outage prediction for natural disasters usually rely on one of two approaches: statistical models or fragility-based methods. Statistical models have provided strong predictive accuracy, but only in an area-aggregated manner. Fragility-based approaches have not offered strong prediction accuracy and have been limited to systems for which system topology or performance models are already available. The following disclosure teaches systems and methods that: (1) generate a synthetic power system layout for any geographic area based only on public data, and then (2) simulate power outages at the level of individual buildings under hazard loading using fragility functions. The approaches disclosed herein provide much more localized, building-level estimates of the likelihood of losing power due to a natural hazard. In one aspect, the disclosed approaches are tested using Franklin County, Ohio, to validate the model by comparing the network properties and power outage events based on the disclosed approaches with the real system. In another aspect, some disclosed approaches are also compared with traditional statistical approaches regarding historical strong wind events. As will be seen, the disclosed approaches rely on less input data, yet can make better predictions than previously known approaches.

Introduction

Power outages cause inconvenience, economic loss, and even endanger human life and safety. Large-scale power outages are often caused by severe weather events or natural hazards. Due to the increase in extreme weather conditions and aging infrastructure, power outage events are occurring with increasing frequency. Combined, 75% of power outages are either directly caused by weather-inflicted faults (e.g. wind or lightning), or indirectly by equipment failures due to wear and tear combined with weather exposure (e.g. heat) (Kezunovic, M., Obradovic, Z., Dokic, T., Zhang, B., Stojanovic, J., Dehghanian, P., & Chen, P.-C. (2017). Predicting Spatiotemporal Impacts of Weather on Power Systems Using Big Data Science. https://doi.org/10.1007/978-3-319-53474-9_12). For example, in 2012, a powerful derecho struck the Midwestern United States and caused 4.2 million people across 11 states to lose power. For some areas, the power restoration took from 7 to 10 days (Eisenbach Consulting LLC. (2017). 9 of the Worst Power Outages in United States History. Retrieved from Electric Choice website: https://www.electricchoice.com/blog/worst-power-outages-in-united-states-history/).

By way of background, there are two broad types of electric (e.g., power) lines: transmission lines (e.g. in a transmission system), and distribution lines (e.g. in a distribution system). The transmission system is generally more for longer distances (e.g. the transmission lines are at a higher voltage, and can transport more electricity). On the other hand, the distribution system is generally for shorter distances (e.g. the voltage on a distribution line is lower).

In the United States, during hazard-related power outage events, the distribution system, which delivers power from local substations to each customer, is more vulnerable (Campbell, R. J. (2012). CRS Report for Congress Weather-Related Power Outages and Electric System Resiliency Specialist in Energy Policy Weather-Related Power Outages and Electric System Resiliency Congressional Research Service Weather-Related Power Outages and Electric System Resiliency Congressional Research Service. Retrieved from www.crs.gov). Compared to the transmission system, which typically is mostly metal towers, the distribution system has lower construction standards (e.g. wooden towers) and is maintained less frequently (see https://callme-power.com/faq/energy-markets/difference-between-transmission-distribution). For the distribution system, when a line breaks, a pole falls, or a distribution substation fails, customers downstream to the failure device(s) become isolated and lose power (Davidson, R. A., Liu, H., Sarpong, I. K., Sparks, P., & Rosowsky, D. V. (2003a). Electric Power Distribution System Performance in Carolina Hurricanes. Natural Hazards Review, 4(1), 36-45. https://doi.org/10.1061/(ASCE)1527-6988(2003)4:1(36)). Therefore, a better understanding of the power distribution system of a region is crucial to achieve a better estimation of power outage events and the vulnerability of each customer. However, the exact distribution network is often confidential and thus is not publically available.

Because a map of the distribution network is not publicly available, some approaches described herein create a synthetic distribution network to model the actual distribution network. Some embodiments use two components to create the synthetic network. One component is the information of customers (e.g. information regarding the power distribution network). As a practical matter, every building in a typical city is powered; thus, some embodiments make the assumption that the locations of customers are the locations of buildings. This is not a precise representation of the actual number of customers, but the spatial distribution of building locations is a good proxy to the actual customer distributions. Such information can be retrieved from building footprint information that is publicly available in the United States (e.g. https://koordinates.com/layer/97440-franklin-count). A second component is the location of distribution substations. While information regarding high voltage substations is often confidential, information regarding low voltage substations is publicly available from open-source map platforms, e.g. overpass-turbo.eu. These substations can be viewed as power supplies that deliver power to each customer. In this regard, some embodiments use three assumptions to make the generation of a synthetic power distribution network feasible. These three assumptions are: 1) power lines are along roads; 2) the system is optimal to some degree; and 3) the network is tree-like (radio-like). Later sections in this disclosure will elaborate on these assumptions. With the above-mentioned two components and three assumptions, some embodiments recreate the synthetic distribution power network to simulate power outages under extreme hazard events.

Some approaches disclosed herein propose a method to generate a synthetic distribution system for the purpose of power outage simulation in the context of natural disasters. Some embodiments are generalizable to the entire United States and can be scaled from city level to state level. Indeed, some embodiments may be applied to any geographic area. To operate, some embodiments require publicly available data. Some embodiments can be used to simulate any type of natural disaster (e.g. hurricane, flood, earthquake, and so forth) that could potentially damage the distribution system's infrastructure components (e.g. underground or overhead power lines, poles, and distribution substations). Some embodiments use damage estimation being provided. The synthetic distribution network can be viewed as a realistic representation of the actual system through the validation criteria.

The following will first discuss what has been studied for power outage prediction, synthetic power grid generation, and infrastructure vulnerability analysis. Next discussed is additional novel methodology to generate the synthetic distribution grid and how to simulate its damage under natural disasters. The following also validates the synthetic network with the actual distribution grid, and tests it with historical large-scale power outage events to demonstrate its functionality in providing emergency planning and restoration information.

Statistical Power Outage Predictions

Statistical methods have been developed and proven to be successful in some contexts. Many power outage prediction studies relate to tropical cyclones and use statistical modeling approaches. Some studies have found covariates that influence power outages. For strong wind activities such as hurricanes and ice storms, maximum gust wind speed, duration of strong winds, 7-day rainfall are all important covariates (Liu, H., Davidson, R. A., & Apanasovich, T. V. (2007). Statistical forecasting of electric power restoration times in hurricanes and ice storms. IEEE Transactions on Power Systems, 22(4), 2270-2279. https://doi.org/10.1109/TPWRS.2007.907587). Trees coming in contact with overhead lines is one of the important factors that will cause power outages during strong wind events as well (Davidson, R. A., Liu, H., Sarpong, I. K., Sparks, P., & Rosowsky, D. V. (2003b). Electric Power Distribution System Performance in Carolina Hurricanes. Natural Hazards Review, 4(1), 36-45. https://doi.org/10.1061/(asce)1527-6988(2003) 4:1(36)). Utility-specific information like number of protective devices, number of poles, number of transformers are also helpful but not necessary for power outage predictions (Nateghi, R., Guikema, S., & Quiring, S. M. (2014). Power Outage Estimation for Tropical Cyclones: Improved Accuracy with Simpler Models. Risk Analysis, 34(6), 1069-1078. https://doi.org/10.1111/risa.12131). Also used has been land cover, soil moisture, long-term drought, mean annual precipitation, topology information to enhance the prediction of power outages under hurricanes (Guikema, Seth David, Nateghi, R., Quiring, S. M., Staid, A., Reilly, A. C., & Gao, M. (2014). Predicting Hurricane Power Outages to Support Storm Response Planning. IEEE Access, 2, 1364-1373. https://doi.org/10.1109/ACCESS.2014.2365716). However, the amount of data required to create the dataset and make predictions is considerable and inaccessible, which limits the application of many accurate but complex models in practice.

Generalized linear models (GLM) and generalized linear mixed models (GLMM) have been used in power outage predictions. Poisson regression and negative binomial regression are both well-known GLM models that have been studied in multiple power outage related tasks. One example used negative binomial GLMs and GLMMs to predict the impacts of tree trimming on outage rates (Guikema, Seth D., Davidson, R. A., & Liu, H. (2006). Statistical models of the effects of tree trimming on power system outages. IEEE Transactions on Power Delivery, 21(3), 1549-1557. https://doi.org/10.1109/TPWRD.2005.860238). Han et al. used data that can be acquired prior to landfall with a negative binomial regression with wind speed, strong wind duration, soil moisture, annual mean precipitation, land cover, and utility-specific information to predict hurricane-related power outages (Han, S. R., Guikema, S. D., Quiring S. M., Lee, K. H, Rosowsky, D. and Davidson, R A. (2008). Estimating the spatial distribution of power outages during hurricanes in the gulf coast region. Reliability Engineering and System Safety. Retrieved from https://www.sciencedirect.com/science/article/pii/S0951832008000665). Furthermore, it has been shown that Generalized Additive Models (GAMs) can improve the predictive accuracy of outages with the same dataset because the linearly dependent assumption of GLM models are limiting (Han, S. R., Guikema, S. D., & Quiring, S. M. (2009). Improving the predictive accuracy of hurricane power outage forecasts using generalized additive models. Risk Analysis, 29(10), 1443-1453. https://doi.org/10.1111/j.1539-6924.2009.01280.x).

For nonparametric methods, one study used CART (Classification and Regression Trees) and BART (Bayesian Additive Regression Trees) to predict the number of damaged poles (Guikema, Seth D., Quiring, S. M., & Han, S. R. (2010). Prestorm Estimation of Hurricane Damage to Electric Power Distribution Systems. Risk Analysis, 30(12), 1744-1752. https://doi.org/10.1111/j.1539-6924.2010.01510.x). Another study used Random Forest (RF) models to predict hurricane power outages and found a small number of input variables (gust wind speed, duration of strong wind, number of customers, tree trimming, and soil moisture) that can produce reasonable prediction accuracy (Nateghi, R., Guikema, S., & Quiring, S. M. (2014). Power Outage Estimation for Tropical Cyclones: Improved Accuracy with Simpler Models. Risk Analysis, 34(6), 1069-1078. https://doi.org/10.1111/risa.12131). Another study also used a RF model with publicly available data to predict hurricane-induced power outages along the entire U.S. coastline for hurricane related power outages (Guikema, Seth David, Nateghi, R., Quiring, S. M., Staid, A., Reilly, A. C., & Gao, M. (2014). Predicting Hurricane Power Outages to Support Storm Response Planning. IEEE Access, 2, 1364-1373. https://doi.org/10.1109/ACCESS.2014.2365716).

The zero-inflated problem is an obstacle in predicting power outages. Zero-inflation occurs when there are more zero response values (in this case outagers) than a standard statistical model can account for. One previously developed approach has been a two-stage process that combines a classification model and a regression model to first predict if there are any power outages occurring and then predict how many outages there are for the areas for which there are outages (Guikema, S. D., & Quiring, S. M. (2012). Hybrid data mining-regression for infrastructure risk assessment based on zero-inflated data. Reliability Engineering and System Safety, 99, 178-182. https://doi.org/10.1016/j.ress.2011.10.012). That previously known approach helped to counter the zero-inflation problem and improve power outage prediction accuracy substantially under hurricanes. Another previously known approach proposed a three-stage method that introduced a new initial stage to predict the severity group of power outage with clustering and RF modeling (Shashaani, S., Guikema, S. D., Zhai, C., Pino, J. V., & Quiring, S. M. (2018). Multi-Stage Prediction for Zero-Inflated Hurricane Induced Power Outages. IEEE Access, 6, 62432-62449. https://doi.org/10.1109/ACCESS.2018.2877078).

Synthetic Power Grid Generation

Synthetic power grid generation has been previously studied. Most work relating to the synthetic power grid has focused on the transmission system (Birchfield, Gegner, Xu, Shetye, & Overbye, 2017; Pahwa, Scoglio, & Scala, 2014; Schultz, Heitzig, & Kurths, 2014; Soltan & Zussman, 2016) and its validation process (Birchfield, Xu, Gegner, Shetye, & Overbye, 2017). Also proposed has been a method to generate synthetic transmission systems and validation criteria (Birchfield, Gegner, et al., 2017). This method first places high voltage substations with a clustering algorithm considering estimated power demands by customers. Next, the method adds transmission lines and meets power flow constraints. The method tests its model with a 2000 bus public test case and fulfills its synthetic network criteria. Another approach presents a Geographical Learner and Generator Algorithm to generate a synthetic network similar to a given network with network structure properties such as average path length, clustering coefficient, degree distribution of the nodes, and length distribution of the lines.

Regarding the distribution grid, many works have focused on the optimal planning of distribution networks (Miranda, V., Ranito, J. V., & Proena, L. M. (1994). Genetic algorithms in optimal multistage distribution network planning. IEEE Transactions on Power Systems, 9(4), 1927-1933. https://doi.org/10.1109/59.331452; Valenzuela, A., Inga, E., & Simani, S. (2019). Planning of a Resilient Underground Distribution Network Using Georeferenced Data. Energies, 12(4), 644. https://doi.org/10.3390/en12040644; Yuan, W., Wang, J., Qiu, F., Chen, C., Kang, C., & Zeng, B. (2016). Robust Optimization-Based Resilient Distribution Network Planning Against Natural Disasters. IEEE Transactions on Smart Grid, 7(6), 2817-2826. https://doi.org/10.1109/TSG.2015.2513048). One example work applied a genetic algorithm to plan the placement of distribution networks. This work assumed the network to be radial and optimize the system under power flow constraints. The work started with possible sites for substations and potential power line locations then used a genetic algorithm to find an optimal solution for the binary integer optimization problem. Another example proposed to use a Minimum Spanning Tree model to create a resilient distribution network with georeferenced data. The work focused on the optimal allocation of a distribution transformer and assumed undergrounding planning only. The goal was to create a distribution network that minimized the total load shedding during unusual and extreme events.

Fragility Curves

Fragility curves are the probability of an infrastructure reaching or exceeding a specific damage state given quantified disaster intensity metrics. One of the most commonly used set of fragility curves are those in HAZUS (a program of the Federal Emergency Management Agency (FEMA)), which describes how critical infrastructure, houses, transportation, etc., becomes damaged by earthquakes, wind, flood, or tsunami (Kircher, C. A., Whitman, R. V., & Holmes, W. T. (2006). HAZUS Earthquake Loss Estimation Methods. Natural Hazards Review, 7(2), 45-59. https://doi.org/10.1061/(asce)1527-6988(2006)7:2(45); Vickery, P. J., Skerlj, P. F., Lin, J., Twisdale, L. A., Young, M. A., & Lavelle, F. M. (2006). HAZUS-MH Hurricane Model Methodology. II: Damage and Loss Estimation. Natural Hazards Review, 7(2), 94-103. https://doi.org/10.1061/(asce)1527-6988(2006)7:2(94)). Given the specific parameters of the infrastructure, it categorizes damage into different states based on the severity, and fit fragility curves with probability distributions.

The vulnerability of the power system and the fragility of each component of the system under earthquake has been studied. For example, power system components can be divided into micro-components (coil support, circuit breaker, transformer, etc.) and macro-components (e.g. a combination of micro-components) and their fragility functions under earthquakes have been modeled using a lognormal distribution (Vanzi, I. (1996). Seismic reliability of electric power networks: Methodology and application. Structural Safety, 18(4), 311-327. https://doi.org/10.1016/S0167-4730(96)00024-0). This method is more detailed and its results can be hard to interpret. On the other hand, HAZUS introduces fragility curves from a much general perspective. It considers generation plants, substations, and distribution circuits as power system components as a unity then proposes fragility functions for each type of the component. For example, HAZUS classifies substations into low voltage, medium voltage and high voltage. For each voltage level, the substation can be anchored or unanchored, determined by if the substation is enhanced with seismic components. It then describes the damage of electric power substation from earthquakes with five different severity states and provides the lognormal parameters of the probability the substation exceeds each damage state given the peak ground acceleration. Such information is valuable for reactive damage estimation, and provides insights prior to disastrous events for risk assessment purposes paired with simulation tools.

For strong wind events, one of the major causes of power outages is from the failure of utility poles (Mohammadi Darestani, Y., & Shafieezadeh, A. (2019). Multi-dimensional wind fragility functions for wood utility poles. Engineering Structures, 183, 937-948. https://doi.org/10.1016/j.engstruct.2019.01.048; Salman, A. M., & Li, Y. (2016). Age-dependent fragility and life-cycle cost analysis of wood and steel power distribution poles subjected to hurricanes. Structure and Infrastructure Engineering, 12(8), 890-903. https://doi.org/10.1080/15732479.2015.1053949). These fragility curves describe the probability of failure of poles given a 3-second gust wind. For example, one study designs the most comprehensive fragility curves for all classes of poles given the parameters of the pole. (Mohammadi Darestani, Y., & Shafieezadeh, A. (2019). Multi-dimensional wind fragility functions for wood utility poles. Engineering Structures, 183, 937-948. https://doi.org/10.1016/j.engstruct.2019.01.048). It considers the age, conductor area, height and wind direction as variables in the lognormal fragility function. However, none of these works incorporate the impacts of trees falling on the power lines or the power poles in their functions.

Methodology
Synthetic Power System Generation

The approaches described herein focus on generating a synthetic power system (e.g. a model of a power infrastructure) that: (i) includes major power infrastructure potentially damaged by natural disasters, and (ii) can imitate the network structure of a real power system. The approaches described herein create network layouts for a power distribution system which describe how each customer obtains power from distribution substations through power lines. In this context, three questions arise. First, which substation powers a particular customer? Second, how does the customer obtain power from that substation? Third, are the power lines overhead or underground?

In some embodiments of the synthetic infrastructure, each building is defined as a customer, which is not strictly true but it can be used as a good proxy. Some infrastructure components used include substations, power lines, poles and so forth. Different infrastructure components have different responses to natural disasters. Substations, which transform voltage from high to low, are likely to be damaged during earthquakes and flooding events leading to regional power outages. Poles are likely to be damaged during strong wind events which disrupt the connectivity from substations to demands.

Power lines can either be overhead or underground. Some embodiments assume that the power lines are strictly along the roads. Based on observations from the actual distribution layout in Franklin County, Ohio, 92% of power lines are within on average 100 m to roads. Thus, some embodiments calculate the distance from each power line polyline's nodes to the closest road intersections and average the value for each polyline. Another reason is that traffic lights need power from the distribution system.

Overhead power line failures are often caused by incidences such as a tree falling, freezing temperatures, lightning, and strong winds, which result in different scales of power outages depending on the network structure. Underground power lines, on the other hand, are immune to most of the severe weather conditions, but are susceptible to ground movements.

One of the advantages of the approaches described herein is the low requirement of data collection in comparison to statistical learning approaches. Some embodiments use only open-source data, for example, road layouts, building locations, partial buildings information, and substation locations, to generate the power system network. Road layouts are available from the United States Census Bureau at the county level as shapefiles. Some embodiments assume that all power lines (overhead or underground) will be along the roads. Although, in reality, power lines are not necessarily along the roads, some embodiments use this assumption and prove that this assumption is an acceptable and appropriate constraint. Some embodiments operate such that power demand locations are the coordinates of each customer within the city/region boundaries. These coordinates may be extracted from any given city's building footprints and approximate each customer location with the centroid of each building. For supply points, the distribution system is focused on because it is more vulnerable to be damaged during most hazard events. Some embodiments use an open-source map query website to scrape all the substation locations. These substations can be seen as the power supplies in the distribution system. With the information of these open-source data, it is possible to create a synthetic power network that provides power connectivity from substations to all customers.

FIG. 1 illustrates an exemplary process 100 of generating a synthetic power system.

Customers Clustering

The first step in generating the distribution system is to create a customer cluster for each substation (e.g. step 110 of FIG. 1). This step answers the previously mentioned first question in synthetic distribution network generation (which substation a customer gets power from).

Advantageously, in creating clusters of customers, some embodiments use the network distance from a customer to a substation rather than the Euclidean distance, and the reason for this will be explained as follows. In the U.S., due to the network typically being radial, each customer is served by only one substation in the actual distribution system. However, there is no indication from the actual system of the service relationship between a specific substation and a customer, especially when the customer is relatively close to multiple substations. A typical assumption in past studies assigns each customer to be served by the substation with the closest Euclidean distance. However, this assumption can lead to different, even flipped results for risk assessment purposes. It eliminates the possibilities the customer is actually served by another substation which experiences a very different damage condition. Moreover, Euclidean distance is not a good metric in determining which substation serves a customer compared to using the actual network distance. For example, a customer might have a closest Euclidean distance to substation A. However, substation A and the customer may be on the two sides of a body of water or some other topographic feature which prevents distribution lines connecting the customer to substation A. Therefore, the network distance is a better metric in this scenario. Thus, some embodiments use the network distance rather than the Euclidean distance.

To enhance the accuracy of risk assessment, some embodiments use the following approach to determine the service territory of each substation. First, the network distances from each customer to all the substations on the road network are calculated. Then, for each customer, some embodiments find the closest substation based on network distances. This yields a basic customer cluster for each substation. This further is helpful to determine the service substation for customers that are only close to one substation. However, it may be difficult to classify customers that have similar network distances to multiple substations. Therefore, some embodiments define $c_i$ as the cluster customer i belongs to and $d_n(i,j)$ as the network distance between customer i, i∈[1, N] with substation j∈[1, M]. Then:

$$c_i = j, \text{if } \frac{d_n(i,j) - d_n(i,j)}{d_n(i,j))} < b$$

Figure 2:
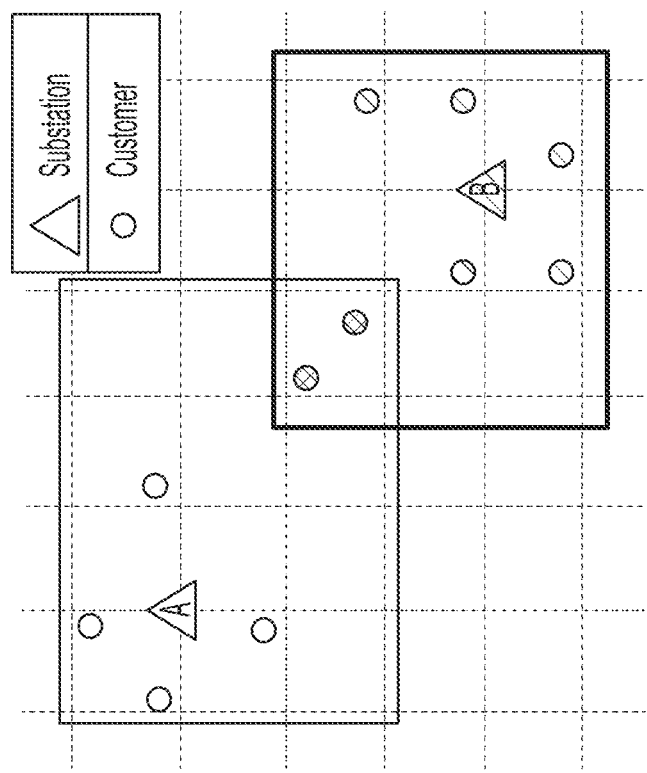
FIG. 2 illustrates an example representation of substations and customers.

This opens the possibility of "border" customers appearing in multiple substation clusters. As an example, shown in FIG. 2, there are two substations, A and B. With reference thereto, the customers shown with a stipple fill are served by substation A; and the customers shown with a hatch fill are served by substation B. Further, the two customers shown with a cross hatch fill have similar distances to both substations, so they are considered to be in both substation clusters. This does not mean that the cross hatch fill customers are served by two substations at the same time, but rather that, in some embodiments, they are simulated independently in each substation cluster that has them. As an output from the simulation, some embodiments report the average possibility or the worst possibility of cross hatch customers losing power from substation cluster A and B. As a result, substation cluster A has six customers and substation cluster B has 7 customers.

Create a Reduced Problem

The following will describe creating a reduced problem (e.g. step 120 of FIG. 1). Instead of creating a fully connected distribution network that connects all the substations and customers, some embodiments create multiple reduced distribution networks given each substation cluster. For each substation cluster, a buffer is generated that is slightly larger than the spatial locations of customers. As examples in FIG. 2, the two substation clusters A and B, along with their customers and the roads within each square buffer formulate two independent reduced problems. Then, for each reduced problem, some embodiments create connectivity for each customer to get power from the substation. The benefit from creating a reduced problem is that it can largely decrease the computational effort required when compared to the effort of running an algorithm on the entire system. Moreover, this is a reasonable relaxation of the original problem, as the actual system is typically radial in the U.S.

Deploy Poles and Road Segmentation

The following will describe deploying poles and road segmentation (e.g. step 130 of FIG. 1). Distribution networks in the U.S. are highly radial and the redundancy of the network is low. Further, each customer is connected to the substation through either utility poles and overhead lines or underground lines. Therefore, it is useful to split the roads into segments in a manner that the distance between two nodes are similar to the actual distance between poles. For each road's polyline, some embodiments define the coordinates of all the nodes of the polyline in the sequence as $(x_1, y_1), (x_2, y_2), \ldots, (x_n, y_n)$. Some embodiments define these nodes as power nodes. In some embodiments, $(x_i, y_i)$ is the beginning node of the road, and $(x_n, y_n)$ is the ending node. Some embodiments define the Euclidean distance between point i and j is as $d_e(i,j)$. The sequence of the polyline can be reversed. Some embodiments also estimate the distance between poles as a constant $d_{pole}$ (e.g. 40 meters) from the observations of the pole distribution of the actual system. Some embodiments define S={ } as the set that contains all the power nodes created from the road shapefile. In some embodiments, the algorithm is as follows. To start, $(x_1, y_1)$ are input into S. If the distance between $(x_1, y_1)$ and $(x_2, y_2)$ is less or equal to $d_{pole}$, so me embodiments input $(x_2, y_2)$ into S. If the distance is larger than $d_{pole}$, some embodiments split the line between $(x_i, y_i)$ and $(x_2, y_2)$ evenly and the number of nodes added is determined by the flooring of $d_e(1,2)/d_{pole}$. For example, if $d_e(1,2)=50$ m, some embodiments add in one point $(x_{1.1}, y_{1.1})$ in the middle of the polyline. Then, nodes $(x_{1.1}, \text{and } (x_2,y_2)$ are input into S. As a result, S contains all the original nodes from road polylines and new nodes created when the distance between neighboring nodes are further than $d_{pole}$. If a power node belongs to an overhead power line, it will be viewed as a utility pole which can be exposed and damaged under extreme wind. A power feeder is the power node that is used to connect to at least one customer.

Generate Distribution Network

The next step is to create connectivity within each cluster to deliver power from a substation to each customer, thereby generating the synthetic distribution network (e.g. step 140 of FIG. 1). Some embodiments propose three different models to accomplish this goal: Steiner Tree (ST), K-mean clustering Steiner Tree (ST-K-mean), and shortest path (SP).

A first method that this disclosure proposes is to connect all the customers and the substation in a minimum cost manner. Put another way, this method seeks to find the tree with the minimum cost that connects all the nodes of interest on an undirected graph. Such a problem is called to find the Steiner tree on the graph. The base network is the road layouts in some embodiments that constrain the power lines to be along roads. The important vertices are power feeders where one or more buildings are close to and connect to them. That said, some embodiments calculate the closest power node for each building, and the power nodes with at least one customer nearby are regarded as important nodes. The Steiner tree problem is a well-studied non-deterministic (NP)-hard problem, and many approximation algorithms have been created to reduce the weight difference from the optimal Steiner tree to the approximation solution. Some embodiments use a known approximation algorithm to solve the problem. Some embodiments define the original road network as an undirected graph G=(N,E), consisting the set N of all the potential power nodes created from 3.1.3 and the set E of all the road segments that connect the power nodes. Some embodiments define another undirected graph G'=(N', E') to be the Steiner tree that is being searched for, N'∈N, E'∈E. The weight of each edge is the length of the road segment. Some embodiments define set $N_1 \in N$ of all the power feeders. The algorithm is as follows.

Step 1: Some embodiments start by selecting a random vertex $s \in N_1$, and finding a vertex $t \in N'$, $s \neq t$ that gives the shortest weighted path $e_{st}$ to s. Some embodiments then add e to E' and all the vertices in $e_{st}$ to N'. This yields a starting tree that connects s and t. Some embodiments then remove s and t from $N_1$.

Step 2: Some embodiments search from all the vertices in $N_1$ and find a vertex u that the weighted path $e_u$ from u to G' is the shortest. Some embodiments then add $e_u$ and all the vertices in $e_u$ to N'. Some embodiments then remove u from $N_1$.

Step 3: Some embodiments then repeat Step 2 until all the vertices in $N_1$ have been connected to G' and $N_1$ becomes empty.

Alternatively, a second method proposed herein may be referred to as the K-mean clustering Steiner tree. In one aspect, this method attempts to imitate the development progress of communities. Some embodiments assume that the development of each substation cluster's distribution system begins with building major power lines from the substation to each community; then, as more and more buildings are built, power lines are constructed. The algorithm will be described as follows.

Step 1: Some embodiments start by spatially clustering customers within each substation cluster with K-mean algorithm and determining the best number of clusters with silhouette score. Some embodiments use the closest power node to each cluster center in G as the centers for communities, i.e. $n_1$, $n_2$, $n_3$.

Step 2: Some embodiments then connect the substation's closest power node $n_s$ to each substation cluster's power nodes $n_1$, $n_2$, $n_3$ with the shortest weighted path on G. Then, some embodiments add these vertices and arcs in G'. Some embodiments then remove substation power nodes and community cluster power nodes from $N_1$.

Step 3: Some embodiments then apply the Steiner tree algorithm to include all the important nodes and paths into G'.

In another alternative, this disclosure proposes a third method. In this third proposed method, some embodiments connect each building to the substation in a shortest weighted path manner. Considering power feeders ($n_1$, $n_2$, $n_3$ . . . ) and the substation power node $n_s$, it is possible to find the shortest path from each power feeder and include the path into G'. In this way, the robustness for a radial network is maximized, as all the buildings are connected to the substation most efficiently. This means that the probability of a building being cut off from power due to component failure on its path to the substation is at the lowest level. Notably, this method can be viewed as a special case of the second method when the number of clusters is equal to the number of customers.

As a result, from each of these three methods, it is possible to generate a distribution layout for each substation cluster. The distribution network enables each customer to be connected to a power node, which is connected to the substation. The connectivity from the substation to each customer determines if a customer is powered or not. Therefore, the distance from the substation to a customer is crucial in determining the customer's probability of losing power. The further the customer is from the substation, the more likely there might be a disruption on the distribution path to cut off power to the customer. Therefore, one of the validation criteria proposed by this disclosure is the network distance from each customer to the substation compared to both the synthetic network and the actual distribution network.

Figure 3:
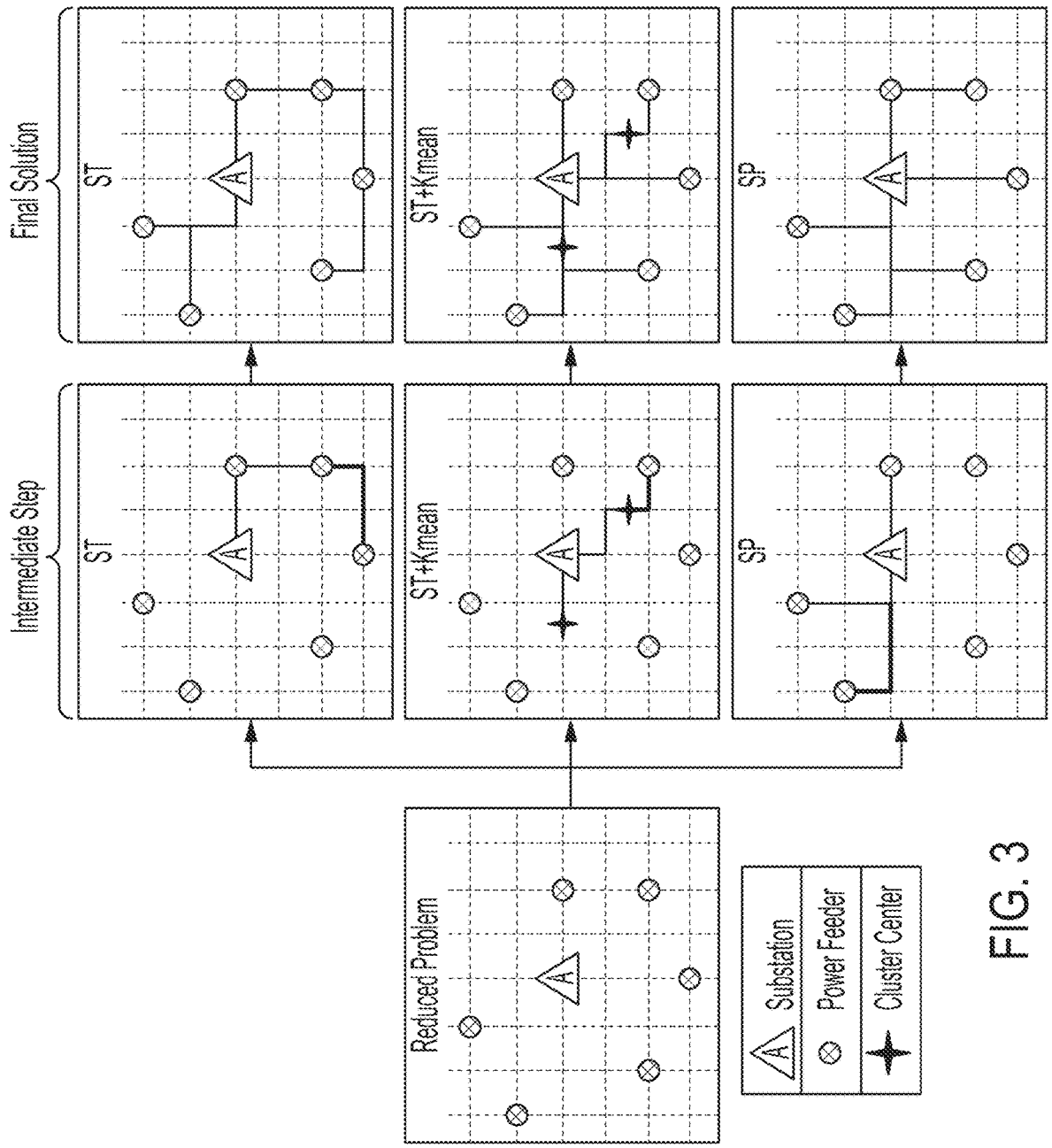
FIG. 3 illustrates examples of three different methods following a reduced problem.

Examples of the three methods (ST; ST-K-mean and SP) are shown in FIG. 3. With reference thereto, cross hatch filled dots are power feeders that deliver power from the distribution network to customers, and the triangle is their substation. The goal is to connect all of them on the network grid with certain rules. Some embodiments assume each dashed line represents a potential choice that can be put on a power line, and implement the three methods proposed above to solve the same problem. The solid bolded lines are expected to be the next power lines to be added into the prior solution represented by the solid unbolded lines. The two stars in the ST+Kmean plot are cluster centers.

Overhead/Underground Power Line Classification

Figure 4:
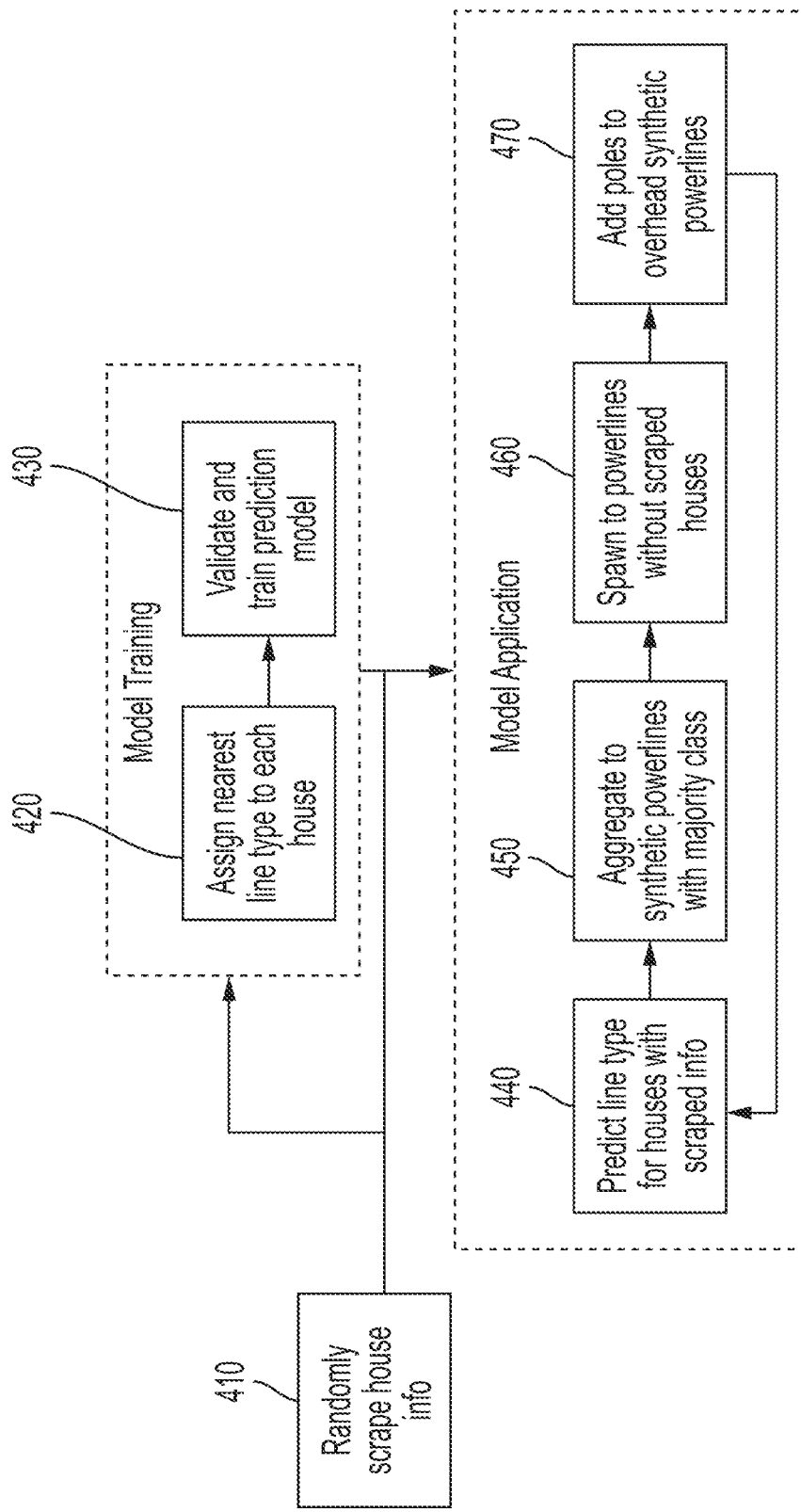
FIG. 4 shows an exemplary method of classifying power lines as either overhead or underground.

In some embodiments, it is critical to determine whether the power lines for each substation cluster are overhead or underground. Such differences can vary the results from certain types of hazard simulation significantly. An exemplary flowchart of this classification process for each substation cluster is shown in FIG. 4.

Some approaches described herein collect a dataset through a publicly available website which has real estate information (e.g. Zillow.com), which is a website containing real estate information. (see step 410 of FIG. 4). Some embodiments consider several factors as predictive variables, and train a statistical learning model to classify the line type that connects to the building. (see steps 420 and 430 of FIG. 4). For instance, undergrounding technology to place power lines underground became more prevalent in the 1970s in the US. Some embodiments select house information, such as the year built of the building, value of the building, finished lot size, parcel lot size, tax assessment as the covariates, and the type of the nearest power line connecting to the building as the response variable. In this regard, it should be noted that a higher home value increases the likelihood of a nearby power line being underground because a higher home value correlates to a newer home which in turns correlates to an increased likelihood of the nearby power line being underground. Some embodiments train the model using a random forest, and validate the model with holdout tests. And some embodiments finalize the model by training with the whole dataset.

However, in actual practice, due to the daily real estate inquiries limitation of publically available websites (e.g. Zillow.com), it may only be possible to obtain house information for a small portion of houses. For example, one attempt retrieved information of 60,000 out of 650,000 houses for Franklin County, Ohio. As a result, the line type of 90% of the power lines cannot be directly predicted by the model for this case study due to a lack of housing information on those roads. This is typical for most areas of the U.S. given reason data scraping times. Therefore, some embodiments first make predictions of the power line type (overhead or underground) for each house with existing data. (e.g. step 440 of FIG. 4). Then, some embodiments aggregate each house's power line type to its closest road by using the majority. (e.g. step 450 of FIG. 4). For example, for a given synthetic power line, an embodiment scraped data from a publicly available website for four houses along the power line; three of the four houses were predicted to be overhead and one was predicted to be underground; thus, the synthetic power line was classified to be overhead. In some embodiments, a tie is classified to be overhead. In other embodiments, a tie is classified to be underground. Subsequently, in some embodiments, for synthetic power lines without any houses with scraped data, power line types are spawned from power lines that have been classified. (e.g. step 460 of FIG. 4). Next, the poles are added to the overhead synthetic power lines. (e.g. step 470 of FIG. 4). Some embodiments iterate through all the unclassified power lines, and find their connected power lines (in FIG. 4, this is illustrated by the optional recursion arrow from step 470 to step 440). In some embodiments, the power line type of undetermined power lines will be randomly sampled from their neighboring and classified power line types. If none of an unclassified power line has been determined, the power line will remain undetermined until the next round. After all the unclassified power lines have been iterated, some embodiments start the process again for any power lines that are still unclassified. The process will end once all the power lines are assigned with a power line type.

Cluster Combination

Following power line classification as either overhead or underground, the clusters are combined at step 160 of FIG. 1 to create the synthetic network.

Power Outage Simulation

Figure 5:
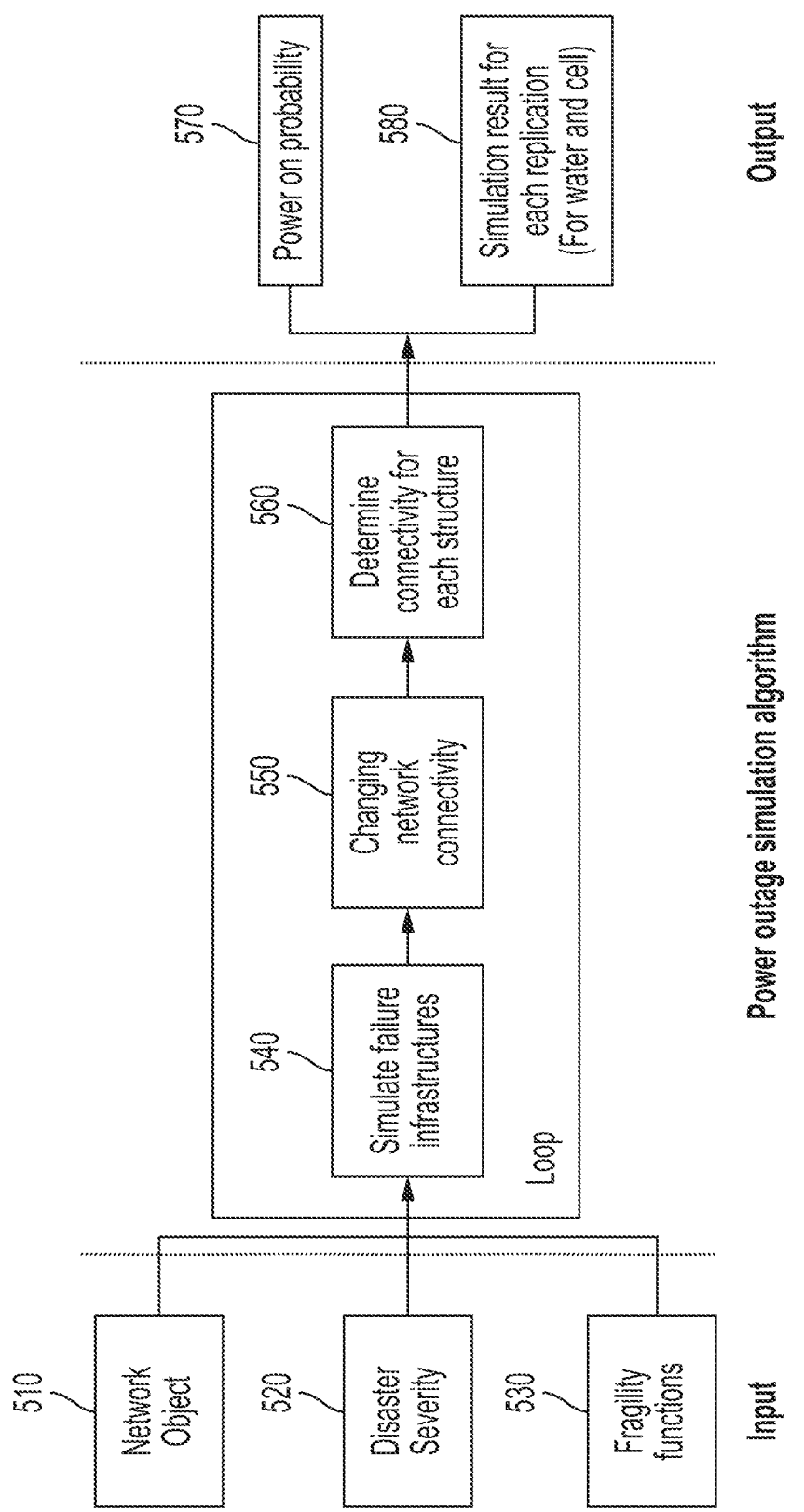
FIG. 5 illustrates an example simulation following the generation of a synthetic network.

Once the synthetic power system is generated, it may be used to simulate power outages under severe weather events with infrastructure fragility curves. (see, e.g., step 170 of FIG. 1). An example simulation is shown in FIG. 5.

The generated synthetic power system can be used to simulate power outages under many different weather events with proper description of the severity of the disaster and valid fragility functions to infrastructure components. The following explains the framework using strong wind events as an example. As a starting point, some embodiments use inputs as the network layouts for each substation cluster, wind speed, and fragility functions. Network layouts include the distribution layouts for each substation cluster of the study area. In one example, wind speed is the three-second wind gust speed that describes the severity of the wind event for all the infrastructure. And the fragility function describes the probability of pole failures given certain wind speed. For each substation cluster, the power outages are simulated with a sufficient number of replications for the probability of power outages of each customer to converge. Within the overall simulation, some embodiments first simulate which infrastructure components fail, e.g. poles and substations. Then, some embodiments change the network structure by removing these infrastructure components. The last step is to check if the customers each still have connectivity to the substation on the damaged network. If there is no route to connect them to the substation because of pole or power line failures, or their substations are damaged, they will lose power. As a result, by summing the simulation results from all the replications for each house, it is possible to learn the probability distribution of a house losing power under the given event. This is informative, and useful information for governments, utility companies, and decision makers.

Result

Case Study

The following discusses Franklin county, Ohio as a study case. Franklin county has approximately 600,000 buildings with a population of 1.3 million. The approach described herein can be applied to any city, county, state, or other geographic area. However, Franklin county, Ohio was selected because of the availability of the historical power outage data and the distribution system's layout which enables validation of the model. The validations are presented in two aspects: (i) the similarity of the generated synthetic networks to the actual distribution network with multiple metrics, and (ii) the performance of the model to simulate a historical power outage event.

Network Validation

One purpose of the synthetic model is to provide informative risk assessment towards the vulnerability of the unknown actual distribution system and customers. In this regard, some approaches described herein first compare the network similarities of the synthetic power network with the actual distribution network. Then, it is possible to evaluate how accurate the overhead/underground classifier is as compared to the actual layout.

Network Similarity

To compare similarity between networks, first, global network parameters (such as the betweenness centrality, average nodal degree, number of circles, and the total length of the network) are compared. These parameters are commonly used to represent the attributes of network graphs, but they are not informative for risk assessment purposes. These metrics are compared for each substation cluster created with all three methods. Nodal degree is the number of nodes that directly connect to a given node. The result is shown in the first four columns of table 1. The result shows that each generated average nodal degree is close to the actual distribution network nodal degree. This is clearly the result of the fundamental structure of the distribution network because most of the nodes in the graph are connected with only two other nodes aiming to deliver electricity. Betweenness centrality quantifies the number of times a node acts as a bridge along the shortest path between two other nodes. The average betweenness centrality is also at the same level between the two systems. Average Number of Circle describes the average number of loops in each substation cluster. Only the overhead system is clustered because the underground system typically is built as an open loop with switches for extra robustness, and thus it is not possible to tell the actual connectivity of the undergrounding network. As can be seen, circles are rare in the overhead distribution network, and this substantiates the assumption that the system is highly radial. The synthetic networks they are all completely radial. Lastly, the total length of the generated synthetic system is compared with the actual system, which shows that they are very close. This further illustrates the legitimacy of the approximation using a road network over using a distribution network.

TABLE 1

| | Average Nodal Degree | Average Betweenness Centrality | Average Number of Circle in Overhead | Total Length of Lines (Meters) | Mean Absolute Difference (m) | Pearson correlation |
|---|---|---|---|---|---|---|
| Actual System | 2.066 | 0.0429 | 2.44 | $1.04 \times 10^8$ | — | — |
| Steiner Tree Heuristic | 1.999 | 0.0400 | 0 | $1.08 \times 10^8$ | 1426 | 0.699 |
| Steiner Tree + Kmean | 1.999 | 0.0389 | 0 | $1.09 \times 10^8$ | 882 | 0.745 |
| Shortest Path | 1.999 | 0.0363 | 0 | $1.07 \times 10^8$ | 693 | 0.842 |

One important metric for risk assessment purposes is the network distance from each customer to its substation. Due to the nature of radial system, some embodiments assume each customer is served by one substation. The probability of losing power for a customer is positively correlated with the customer's network distance to the substation. For each customer on the synthetic network, the shortest path is calculated to the substation the customer is assigned to. If a customer is within multiple substation clusters, some embodiments use the closest for comparison. The result is shown in the last two columns in Table 1. As for the result of the measurement of each building to the nearest substation's distance between the two networks, the best found is the shortest path model. The average absolute difference in distance to the actual network is 693 m. With respect to the calculated Pearson correlation, the shortest path model outperforms the other two models as well. To further explain, the Pearson correlation coefficient measures the linear correlation between two variables. The closer the value is to 1, if one of the variables increases, the other variable is more likely to increase as well. In other words, the best model can be informative about the relative risks of customers losing power.

Overhead/Underground Power Lines Classification Validation

The second step is to evaluate the accuracy of the overhead/underground classifier. In this regard, we first tested the out-of-bag accuracy of the model given the dataset. As a result, with random forest the average out-of-sample prediction accuracy from 30 holdouts is 91%. The in-sample prediction accuracy with the whole dataset is 100%. 10.6% of the synthetic power lines are directly predicted from the dataset and the accuracy is 100% (due to in-sample prediction). After applying the power line type spawning algorithm, the overall prediction accuracy for the whole network is 84.1% for the study region. One issue with the model is that it cannot capture commercial buildings because information on commercial buildings is not readily available (e.g. on publicly available websites). However, the level of accuracy of the model is already promising with the limited dataset, and the accuracy may further be increased with more housing information or data sources.

Extreme Weather Simulation

Franklin County, Ohio—Derecho, 2012

The following description uses the proposed model to test with a hazard instance for the study region. One of the scenarios is the Derecho that occurred in Franklin County, Ohio on Jun. 29, 2012. The event caused more than half customers to lose power for the county. The utility outage data is available to compare with the model outputs. During the event, high winds drove the power outages. The maximum gust wind speeds during the event were retrieved for all the airports in or near the county and interpolated to obtain the gust wind speed for each pole given the pole's spatial location to those airports.

In one instance, the fragility curves developed by Darestani and Shafieezadeh (see Mohammadi Darestani, Y., & Shafieezadeh, A. (2019). Multi-dimensional wind fragility functions for wood utility poles. Engineering Structures, 183, 937-948. https://doi.org/10.1016/j.engstruct.2019.01.048) were applied. The fragility of poles under wind events is determined by the class, wind speed and direction, age, diameter of conductors, heights. By inputting these parameters, it is possible to calculate the probabilities of poles to fail and use them to simulate the change of network connectivity. In the example, the gust wind speed is known for all the major airports, and the structure of the network is also known. This information is leveraged by approximating the gust wind speed at each pole to be the same as at the closest airport. Next, different combinations of pole parameters are applied, and sensitivity analysis is conducted to cover the gap of unknown pole information. For some simulations, during strong wind events, the damage will be on poles only, as some simulations do not consider the potential line damage due to falling trees. In one aspect, a convergence test was conducted on the average customers without power for several substation clusters with 50,000 replications. And, it was found that the relative difference for the average customers without power was less than 1% after 10,000 replications.

Figure 6:
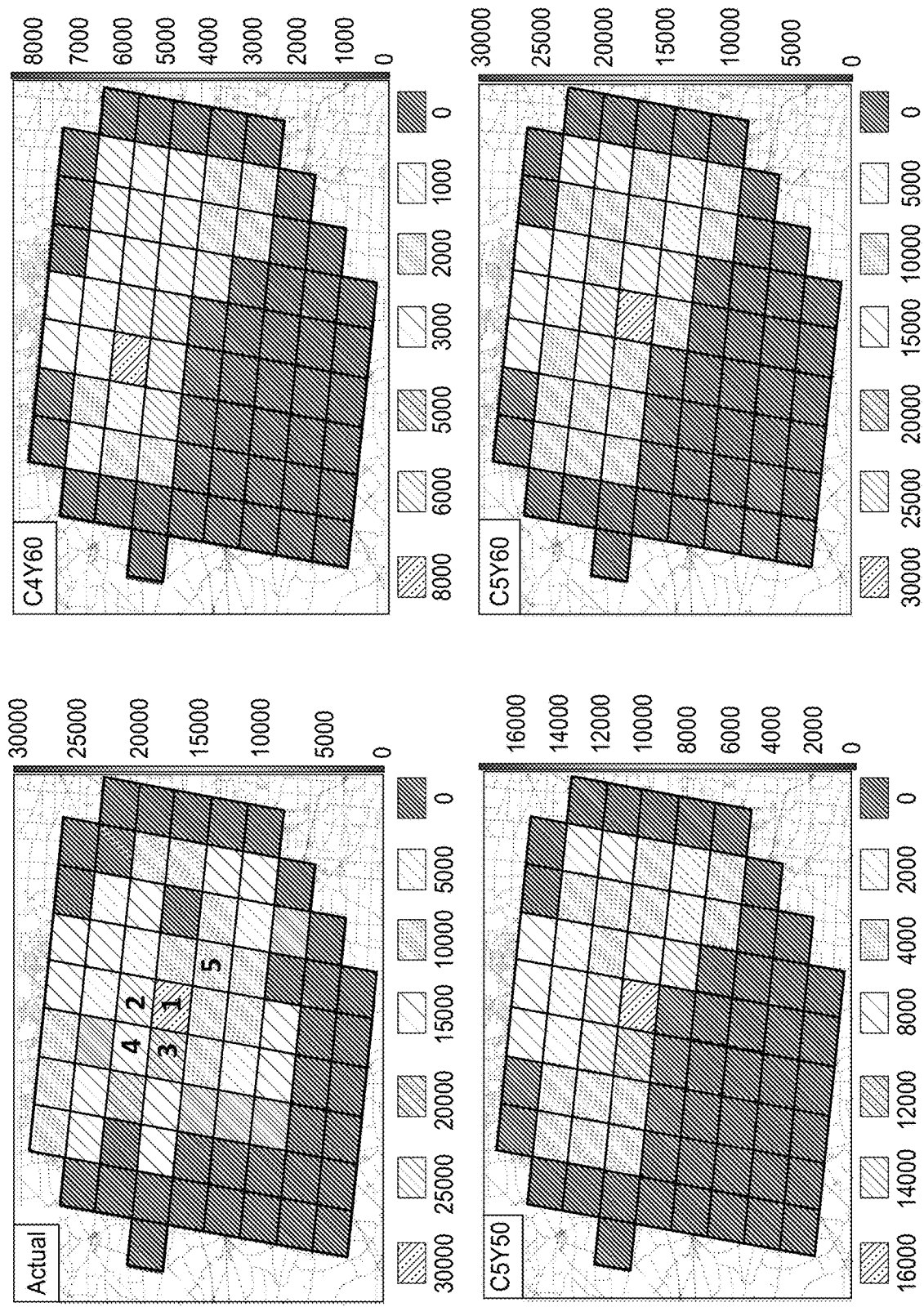
FIG. 6 shows simulation results compared to an actual event.

FIG. 6 shows the simulation results compared with the actual event in 5 km by 5 km grids. It was assumed that all the poles are the same, and different types of poles were tested in each scenario; the different types of poles were 60-year-old class 4 poles, 50-year-old class 5 poles, and 60-year-old class 5 poles. The age of poles was estimated from the average age of buildings in the region. The pole class was determined by the minimum circumference that depends on the species of tree and the length of the pole. Higher-class poles (e.g. class five) typically are less resilient than lower-class poles (e.g. class four). Class four and five poles are typically used in distribution systems. From these simulation scenarios, it is possible to obtain insight on the relative risks of losing power. With 60-year-old class 4 poles, the damage to the system is minor and is centralized in one grid. Class 4 poles are more resistant compared to class 5 poles. For the two scenarios with class 5 poles, more similar results to the actual scenario can be seen. The simulations captured the three most damaged grid cells (1,2,3), but overestimated the damage for grid cell 4 and 5. Also captured was the mild damage for the south western of the county. One difficulty in simulating this Derecho event is the lack of information for the disaster. In this regard, only gust wind speed at major airports was used to approximate the gust wind damage to poles. A more detailed wind speed map would improve the simulation results.

Corpus Christi—Harvey, 2017

Figure 7:
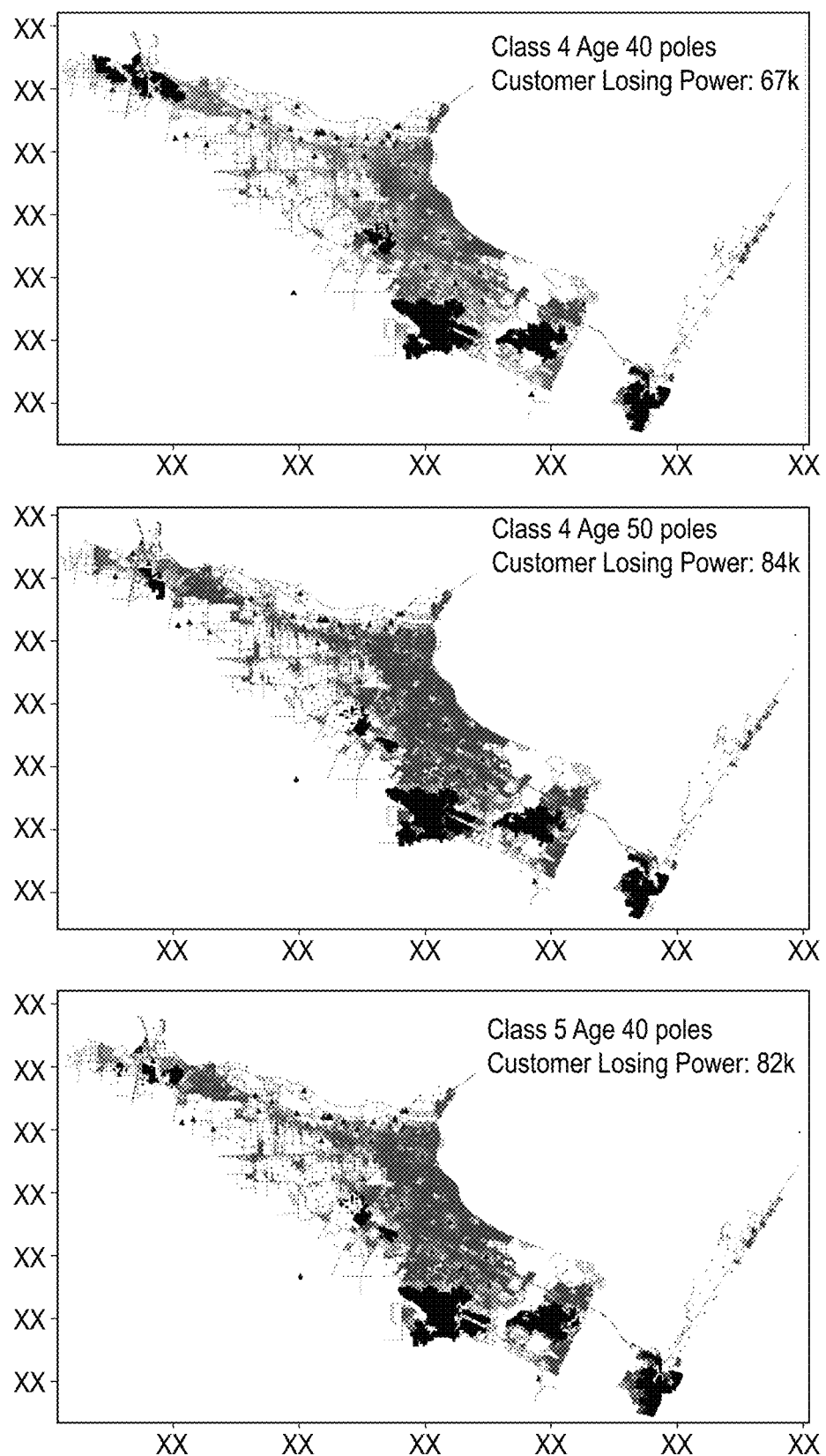
FIG. 7 shows an example relating to hurricane Harvey.

Hurricane Harvey made landfall in Texas on Aug. 23, 2017. The hurricane caused a loss of human lives, infrastructure damage, and economic harm. During the event, massive power outages occurred in multiple major cities due to strong wind, hurricane surge, and flooding caused by rainfall. Techniques disclosed herein were applied to the city of Corpus Christi, TX during hurricane Harvey to test the ability of the techniques in estimating power outages. The peak number of customers without power reported by AEP during Harvey for Corpus Christi was around 90,000. The results are shown in FIG. 7; the grey area illustrates buildings that are more likely to lose power, and the black illustrates buildings that are less likely to lose power. The poles were assumed to be 40-year-old class 4 poles, 50-year-old class 4 poles, and 40-year-old class 5 poles based on the building stock age for the city. The black areas shown on the map are mostly predicted to be undergrounding power lines which prevent them from losing power.

Example Embodiment

Figure 8:
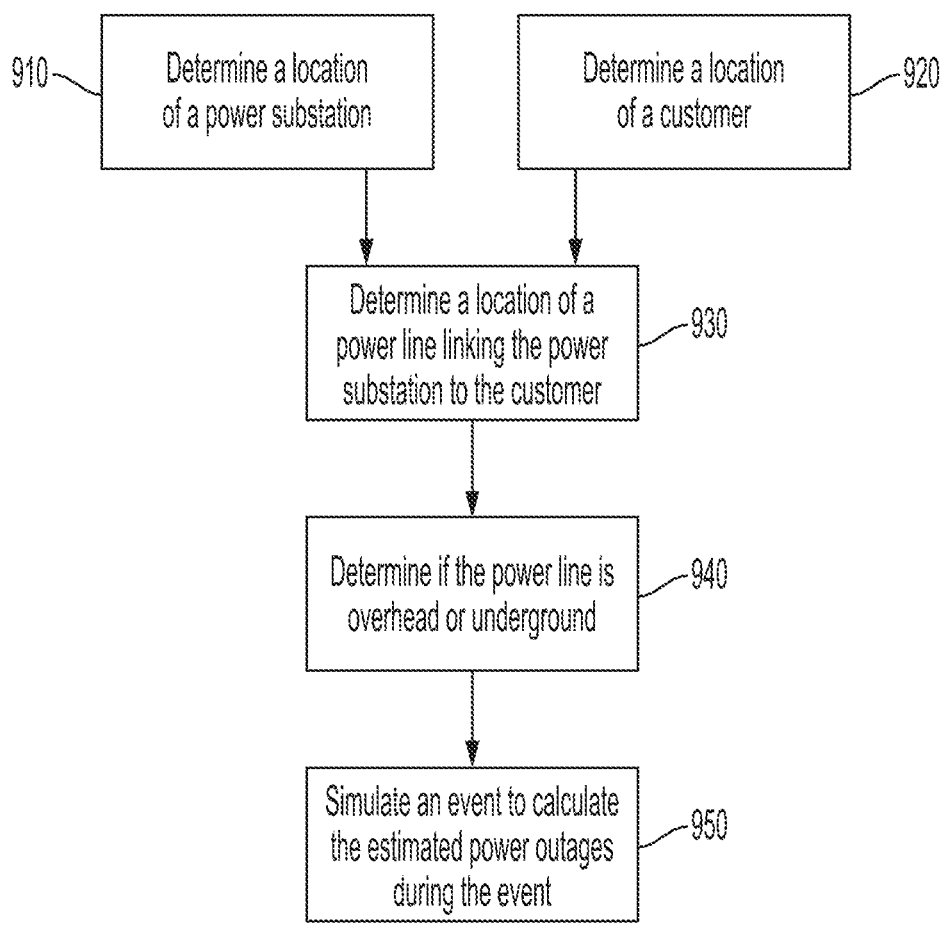
FIG. 8 shows a flowchart of an exemplary embodiment.

FIG. 8 illustrates a flow chart of an exemplary embodiment. With reference thereto, in step 910, a location of a power substation is determined. In step 920, a location of a customer (e.g. of a building of a customer) is determined. In step 930, a location of a power line linking the power substation to the customer is determined. In step 940, it is determined if the power line is overhead or underground. In step 950, an event (e.g. a natural disaster) is simulated to calculate the estimated power outages during the event.

Additional Exemplary Embodiments

Aspect 1. A computer system for calculating estimated power outages, the computer system comprising one or more processors configured to:
create a synthetic network of a power infrastructure of a geographic area by:
  determining a location of a power substation;
  determining a location of a customer;
  determining a location of a power line linking the power substation to the customer; and
  determining whether the power line is overhead or underground; and
simulate an event to calculate the estimated power outages during the event, wherein the calculation of the estimated power outages is based on the determination of whether the power line is overhead or underground.

Aspect 2. The computer system of aspect 1, wherein the one or more processors are further configured to determine the location of the power line based on a location of a road.

Aspect 3. The computer system of aspect 1, wherein the one or more processors are further configured to make the determination of whether the power line is overhead or underground by training a machine learning algorithm by using a year that a building was built as an input to the machine learning algorithm.

Aspect 4. The computer system of aspect 1, wherein the one or more processors are further configured to make the determination of whether the power line is overhead or underground by training a random forest algorithm by using a year that a building was built as an input to the random forest algorithm.

Aspect 5. The computer system of aspect 1, wherein the power line is a first power line, and wherein the one or more processors are further configured to make the determination of whether the power line is overhead or underground by training a machine learning algorithm by using a type of a nearest power line to the first power line as a response variable.

Aspect 6. The computer system of aspect 1, wherein the one or more processors are further configured to make the determination of whether the power line is overhead or underground by training a machine learning algorithm by using at least one of: a value of a building; a finished lot size; parcel lot size; and a tax assessment.

Aspect 7. The computer system of aspect 1, wherein the event includes at least one of: an earthquake; a windstorm; and a hurricane.

Aspect 8. The computer system of aspect 1, wherein the one or more processors are further configured to simulate the event to calculate the estimated power outages during the event by using a fragility function.

Aspect 9. A computer-implemented method for calculating estimated power outages, the method comprising:
creating a synthetic network of a power infrastructure of a geographic area by:
  determining a location of a power substation;
  determining a location of a customer;
  determining a location of a power line linking the power substation to the customer; and
  determining that the power line is underground; and
simulating an event to calculate the estimated power outages during the event, wherein the calculation of the estimated power outages is based on the determination that the power line is underground.

Aspect 10. The computer-implemented method of aspect 9, wherein event is a high wind event, and wherein the determination that the power line is underground decreases a probability of an estimated power outage of the estimated power outages.

Aspect 11. The computer-implemented method of aspect 9, wherein the determination of the location of the power line is based on a location of a road.

Aspect 12. The computer-implemented method of aspect 9, wherein the determination that the power line is underground includes training a machine learning algorithm by using a year that a building was built as an input to the machine learning algorithm.

Aspect 13. The computer-implemented method of aspect 9, wherein the determination that the power line is underground includes training a random forest algorithm by using a year that a building was built as an input to the random forest algorithm.

Aspect 14. The computer-implemented method of aspect 9, wherein the power line is a first power line, and wherein the determination that the power line is underground includes training a machine learning algorithm by using a type of a nearest power line to the first power line as a response variable.

Aspect 15. A computer system for calculating estimated power outages, the computer system comprising one or more processors configured to:
create a synthetic network of a power infrastructure of a geographic area by creating a plurality of clusters, wherein each cluster of the plurality of clusters includes a substation and a plurality of buildings, and wherein each cluster is: (i) created based on a network distance from a building of the plurality of buildings of the cluster to the substation of the cluster, and (ii) not based on a Euclidian distance from the building of the plurality of buildings of the cluster to the substation of the cluster; and
simulate an event to calculate the estimated power outages during the event, wherein the calculation of the estimated power outages is based on the created synthetic network.

Aspect 16. The computer system of aspect 15, wherein the one or more processors are further configured to create the synthetic network by, for each cluster of the plurality of clusters, apply one of: a Steiner Tree (ST); a K-mean clustering Steiner Tree (ST-K-mean); and a shortest path (SP).

Aspect 17. The computer system of aspect 15, wherein the one or more processors are further configured to:
create the synthetic network of the power infrastructure by, for at least one cluster of the plurality of clusters, determining:
a location of a power line linking a building of the plurality of buildings of the at least one cluster to the substation of the cluster; and
if the power line is overhead or underground; and
wherein the calculation of the estimated power outages is further based on the determination of if the power line is overhead or underground.

Aspect 18. The computer system of aspect 17, wherein the one or more processors are further configured to make the determination of if the power line is overhead or underground by training a machine learning algorithm by using a year that a building was built as an input to the machine learning algorithm.

Aspect 19. The computer system of aspect 17, wherein the one or more processors are further configured to make the determination of if the power line is overhead or underground by training a random forest algorithm by using a year that a building was built as an input to the random forest algorithm.

Aspect 20. The computer system of aspect 17, wherein the power line is a first power line, and wherein the one or more processors are further configured to make the determination of if the power line is overhead or underground by training a machine learning algorithm by using a type of a nearest power line to the first power line as a response variable.

Other Matters

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

What is claimed:

1. A computer system for calculating estimated power outages, the computer system comprising one or more processors configured to:
create a synthetic network of a power infrastructure of a geographic area by:
determining a location of a power substation;
determining a location of a customer;

determining a power line: (i) linking the determined location of the power substation to the determined location of the customer, and (ii) based on an assumption that the power line is located along a road; and determining whether the determined power line is overhead or underground by: (i) retrieving at least one characteristic of a building, wherein the building is (a) associated with the customer, and (b) corresponds to the road, and (ii) determining whether the determined power line is overhead or underground based on the retrieved at least one characteristic of the building; and simulate an event to calculate the estimated power outages during the event including setting a location of the power line to a location along the road, wherein the calculation of the estimated power outages is based on the determination of whether the power line is overhead or underground.

2. The computer system of claim 1, wherein the one or more processors are further configured to make the determination of if the power line is overhead or underground by training a machine learning algorithm by using a year that a building was built as an input to the machine learning algorithm.

3. The computer system of claim 1, wherein the one or more processors are further configured to make the determination of whether the power line is overhead or underground by training a random forest algorithm by using a year that a building was built as an input to the random forest algorithm.

4. The computer system of claim 1, wherein the power line is a first power line, and wherein the one or more processors are further configured to make the determination of whether the power line is overhead or underground by training a machine learning algorithm by using a type of a nearest power line to the first power line as a response variable.

5. The computer system of claim 1, wherein the one or more processors are further configured to make the determination of whether the power line is overhead or underground by training a machine learning algorithm by using at least one of:
a value of a building;
a finished lot size;
parcel lot size; or
a tax assessment.

6. The computer system of claim 1, wherein the event includes at least one of:
an earthquake;
a windstorm;
a flood; or
a hurricane.

7. The computer system of claim 1, wherein the one or more processors are further configured to simulate the event to calculate the estimated power outages during the event by using a fragility function.

8. The computer system of claim 1, wherein the one or more processors are further configured to make the determination of whether the power line is overhead or underground by training a machine learning algorithm by using all of:
a value of a building;
a finished lot size;
parcel lot size; and
a tax assessment.

9. The computer system of claim 1, wherein the at least one characteristic includes all of:
a value of the building;
a finished lot size corresponding to the building;
parcel lot size corresponding to the building; and
a tax assessment of the building.

10. A computer-implemented method for calculating estimated power outages, the method comprising:
creating a synthetic network of a power infrastructure of a geographic area by:
determining a location of a power substation;
determining a location of a customer;
determining a power line: (i) linking the determined location of the power substation to the determined location of the customer, and (ii) based on an assumption that the power line is located along a road; and determining that the determined power line is underground by: (i) retrieving at least one characteristic of a building, wherein the building is (a) associated with the customer, and (b) corresponds to the road, and (ii) determining that the determined power line underground based on the retrieved at least one characteristic of the building; and simulating an event to calculate the estimated power outages during the event including setting a location of the power line to a location along the road, wherein the calculation of the estimated power outages is based on the determination that the power line is underground.

11. The computer-implemented method of claim 10, wherein event is a high wind event, and wherein the determination that the power line is underground decreases a probability of an estimated power outage of the estimated power outages.

12. The computer-implemented method of claim 10, wherein the determination that the power line is underground includes training a machine learning algorithm by using a year that a building was built as an input to the machine learning algorithm.

13. The computer-implemented method of claim 10, wherein the determination that the power line is underground includes training a random forest algorithm by using a year that a building was built as an input to the random forest algorithm.

14. The computer-implemented method of claim 10, wherein the power line is a first power line, and wherein the determination that the power line is underground includes training a machine learning algorithm by using a type of a nearest power line to the first power line as a response variable.

15. A computer system for calculating estimated power outages, the computer system comprising one or more processors configured to:
create a synthetic network of a power infrastructure of a geographic area by creating a plurality of clusters, wherein each cluster of the plurality of clusters includes a substation and a plurality of buildings, and wherein each cluster is created based on a network distance from a building of the plurality of buildings of the cluster to the substation of the cluster; and simulate an event to calculate the estimated power outages during the event including setting a location of a power line to a location along a road, wherein the calculation of the estimated power outages is based on the created synthetic network; and wherein the one or more processors are further configured to:

create the synthetic network of the power infrastructure by, for at least one cluster of the plurality of clusters, determining:

a power line linking a building of the plurality of buildings of the at least one cluster to the substation of the cluster; and if the power line is overhead or underground by: (i) retrieving at least one characteristic of a building, wherein the building is (a) associated with a customer, and (b) corresponds to the road, and (ii) determining if the determined power line is overhead or underground based on the retrieved at least one characteristic of the building; and wherein the calculation of the estimated power outages is further based on the determination of if the power line is overhead or underground.

16. The computer system of claim 15, wherein the one or more processors are further configured to create the synthetic network by, for each cluster of the plurality of clusters, apply one of:

a Steiner Tree (ST);
a K-mean clustering Steiner Tree (ST-K-mean); or
a shortest path (SP).

17. The computer system of claim 15, wherein the one or more processors are further configured to make the determination of if the power line is overhead or underground by training a machine learning algorithm by using a year that a building was built as an input to the machine learning algorithm.

18. The computer system of claim 15, wherein the one or more processors are further configured to make the determination of if the power line is overhead or underground by training a random forest algorithm by using a year that a building was built as an input to the random forest algorithm.

19. The computer system of claim 15, wherein the power line is a first power line, and wherein the one or more processors are further configured to make the determination of if the power line is overhead or underground by training a machine learning algorithm by using a type of a nearest power line to the first power line as a response variable.

* * * * *